July 24, 1956  F. S. REPLOGLE, JR., ET AL  2,756,345
ACOUSTIC IONIZATION DETECTOR Filed April 6, 1955  2 Sheets-Sheet 1

Frank S. Replogle, Jr.
David R. Whitehouse  Inventor
By W. R. Maltby
L. I. Shogo
Attorneys

United States Patent Office 2,756,345
Patented July 24, 1956

2,756,345
ACOUSTIC IONIZATION DETECTOR

Frank S. Replogle, Jr., Ridgefield, Conn., and David R. Whitehouse, Evanston, Ill., assignors, by mesne assignments, to the United States of America as represented by the Secretary of the Navy Application April 6, 1955, Serial No. 499,772

10 Claims. (Cl. 250—83.1)

This invention pertains to the detection and measurement of high intensity radiation and more particularly to the detection and measurement of neutron fluxes encountered in nuclear reactors. A novel radiation detecting apparatus is delineated which utilizes an ionization chamber coupled to means producing an acoustic frequency pressure variation within the chamber and in which the output of the detecting apparatus is an acoustic frequency signal.

Other types of radiation detectors incorporating ionization chambers have been built and used with some degree of success. However, practically all such ionization chamber detectors presently being used have a direct current (D. C.) output requiring a D. C. amplifier or a pulse output requiring a wide bandwidth, high frequency alternating current (A. C.) amplifier.

It is an object of this invention to provide a radiation detector having an alternating current signal output in order to eliminate the need for complicated pulse amplifiers or direct current amplifiers with their associated drift problems.

It is also an object to provide a radiation detector operable from an audio frequency voltage supply and in which the simultaneous use of a D. C. bias supply is optional.

A further object is to provide a radiation detector of the ionization chamber type for the detection of high radiation levels in which the electrodes may be solid plates or rods instead of fragile wire and in which electrode leakage currents due to insulator destruction in high radiation do not affect the radiation detector output.

It is a still further object of this invention to provide a rugged radiation detector of comparative system simplicity in which a time response of the order of one millisecond is practical.

A further object is to provide a method of operating an ionization chamber permitting selection of a range of particle velocities and the logging of variations in the intensity thereof.

A still further object is to provide means for remotely observing high intensity uncharged particle concentrations of various intrinsic energies.

Another object is to provide absorption chambers for measurement of flux density of selected transient atomic fragments passing therethrough productive of a signal detectable by acoustic means.

Other objects and many of the attendant advantages of this invention will be readily appreciated as the same becomes better understood by reference to the following detailed description when considered in connection with the accompanying drawings wherein.

Figure 1:
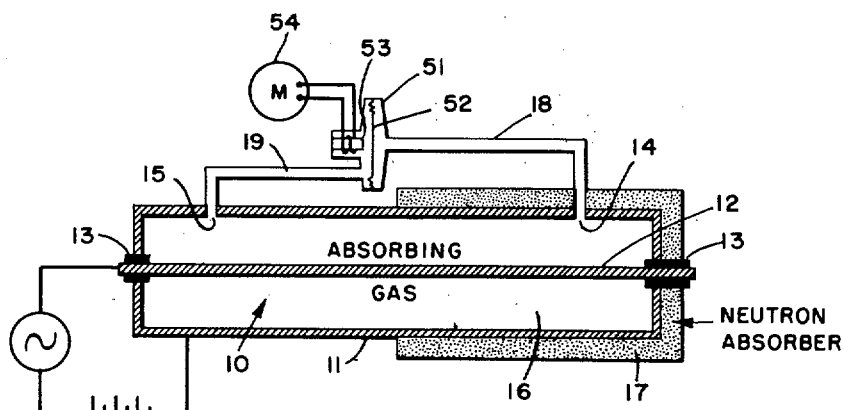
Fig. 1 is a diagrammatic and sectional view of an absorption chamber and associated apparatus according to this invention.
Figure 2:
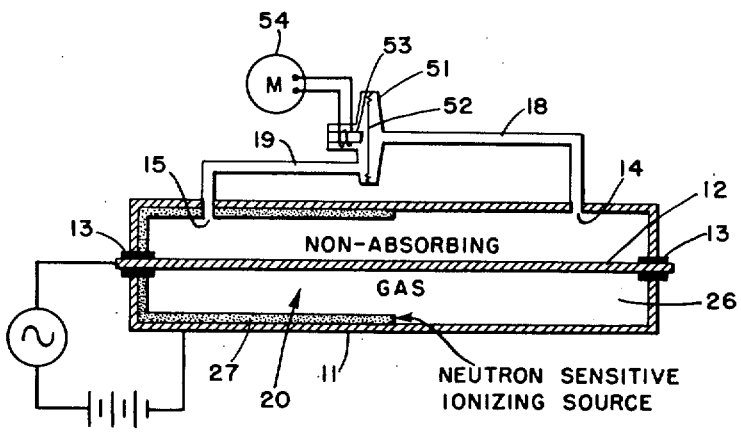
Fig. 2 is a similar sectional view of an alternate form of the invention employing a second ionization chamber arrangement.
Figure 3:
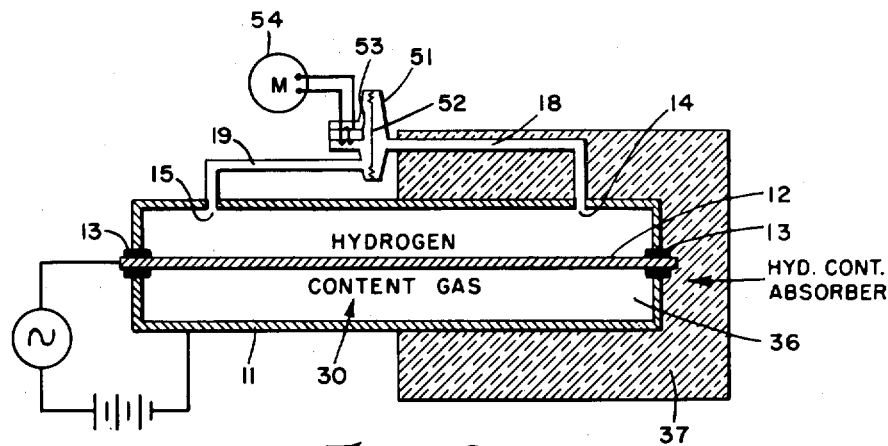
Fig. 3 is a similar sectional view of apparatus separating hard components of nuclear radiation from soft components thereof for measurement purposes.
Figure 4:
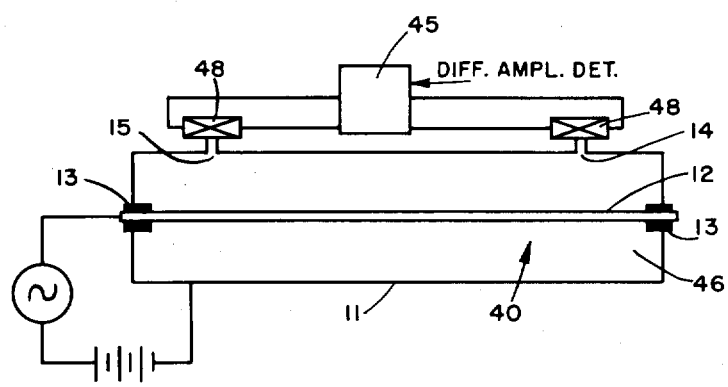
Fig. 4 illustrates diagrammatically an alternate form of detection apparatus suitable in various remote measurement applications.

Referring now to the drawings wherein like numerals designate like parts throughout the several views, there is shown generally, in Fig. 1, an absorption chamber 10 constituting one form of an ionization chamber and, in Figs. 2, 3 and 4, a similar absorption chamber designated as 20, 30 and 40, respectively. In Fig. 1, absorption chamber 10 comprises a chamber, preferably cylindrical in shape, having a sealed outer wall 11 which may be of metal or provided with a conducting coating on the inner surface thereof, whereby it may be connected to a suitable source of field energization such as the illustrated battery in series with a source of alternating E. M. F. The wall 11 forms one terminal for applying a field radially throughout the chamber. The chamber is preferably provided with a central rod 12 serving as an ion collector and as a means applying opposite polarity of the applied field to the space within the chamber. The collector or rod 12 is preferably sealed at the ends of the chamber through insulating bushings 13, whereby the field connection may be made at one end of the rod 12. By way of example, the chamber 10 may be of one or two inches diameter and the rod 12 may be of the order of one-half inch diameter or less. The rod diameter has some influence, as is well known in the art, upon the field distribution within the chamber. For the purpose of the present invention, ion multiplication is not employed and the center electrode may be made as large as convenient. The chamber 10 is provided with ports 14 and 15 communicating with the interior of the chamber and located preferably near the ends of the chamber. In the illustrations of Figs. 1, 2 and 3, ducts 18 and 19 lead respectively from ports 14 and 15 to a suitable device for detecting differential pressure between the two ends of the chamber.

Within the chamber of Fig. 1, there is provided a gas which absorbs or is acted upon by the radiations to be measured. The gas illustrated at 16 is selected for its ability to absorb slow neutrons and, as a result thereof, to produce electrons or ions acted upon by the field imposed between electrodes 11 and 12. In accordance with one of the objects of the invention, it is desired to measure the intensity of slow neutron flux within a sampling area such as may be occupied by the chamber 10. It is customary in the art to refer to slow neutrons as those having individual energies of approximately .025 electron volts or less, these slow neutrons being otherwise referred to as "thermal neutrons."

It should be noted that other ionizing radiations will normally be present in a pile reactor or in any other area of high intensity nuclear particle bombardment. These include gamma rays and beta rays. These rays will be more or less effective in producing ionization within the gas 16, depending upon the concentration and composition of the gas and shielding of the chamber. A suitable gas 16 may be boron trifluoride or other conventional gas having known ion producing qualities under influence of thermal neutron bombardment. It is generally not possible to select a gas which is free from ionization by beta and gamma radiation, and this is one difficulty which has heretofore impaired employment of ionization chambers as here illustrated for measurement of the neutron component. On the other hand, the measurement of the thermal neutron component of the radiation is of particular importance and does not normally vary at the same rate or from the same causes as the variation in other ionizing radiations which may be present.

Direct current energization between electrodes 11 and 12 is essential to operation of conventional ionization chambers of the character illustrated. If there is superimposed upon the direct current field an alternating E. M. F. not greater in amplitude than the direct current voltage, there will be produced a varying unidirectional potential which may be substantially 100% modulated. For example, the direct current voltage may be 600 volts and the alternating current voltage illustrated in series therewith may be 500 volts, such that there is substantially full modulation of a direct current field between electrodes 11 and 12.

For the purpose of exposition the invention will be described with the electrodes 11 and 12 energized from a direct current source in series with an alternating E. M. F. source. The use of a direct current bias supply, however, is optional and the invention is fully operable when energized only from an alternating E. M. F. source. When the invention is operated solely from an alternating E. M. F. supply, the frequency of the pressure wave created in the ionization chamber is twice the frequency obtaining in the chamber when the invention is operated from a source of direct current in series with an alternating E. M. F. not greater in amplitude than the direct current voltage.

In a strong field applied across a gaseous ion-collecting chamber, such as the ionization chamber 10, ions are produced upon bombardment of the atoms or molecules of the gas 16, which ions are impelled with greater or less force and velocity toward the electrode of opposite polarity, the velocity depending upon the field obtaining at that instant. As the ions are thus accelerated by the periodically varying field, they collide repeatedly with atoms of the gas, giving up on each impact a portion of the electrical acceleration energy and thereby imparting kinetic motion to the gas. This kinetic energy increase appears as a temperature rise in the gas. The temperature rise occurs by increments and is essentially adiabatic at the frequency of field energization selected and the pressure increment is generated throughout the ionized volume.

Since the heating and pressure effects depend both upon the ionization intensity and the instant collecting field with provides the kinetic energy, it is evident that either variable factor can be changed at a rapid rate to provide a pressure increment indicative of the relatively more constant instant value of the other variable factor. This invention employs the E. M. F. of any convenient A. C. source in series with a D. C. field to periodically vary the heating effect at a rate, considering the chamber dimensions and ionization intensity, which provides favorable pressure increments. The customary method of measuring the average ion current presents difficult drift errors, and is not here used.

There is shown in Fig. 1 a shield of material 17 surrounding substantially one-half of the absorption chamber. The material 17 may be selected among the various materials which absorb or otherwise stop passing neutrons of low energy, such as the thermal neutrons, illustratively considered. The neutron absorbing material 17 is preferably made sufficiently thick to stop substantially all of the slow neutrons. For this purpose, a solid containing boron is preferable since boron is an excellent absorber for slow neutrons. It will be seen that the chamber 10, when surrounded for one-half its length with a neutron shield, will then be internally bombarded only in the opposite half thereof. In the presence of a steady ion-collecting field between electrodes 11 and 12, a rise of pressure will be noted within the chamber 10, approximately one-half that which would be expected in the absence of the shield material 17, and this increased pressure would be expected to appear equally at ports 14 and 15.

It will now be apparent that large and rapid variations in the collecting field between the electrodes of each of the figures will produce a time-modulated series of pressure increments within the chamber. It is also evident that a rise in pressure at one end of the chamber results in a movement of the gas toward the opposite end. The dimensions of the chamber may then be selected with reference to the frequency of variation of the electric field, such that a resonant condition obtains within the gas of the chamber. For this purpose, various frequencies have been employed, from 60 to 6,000 cycles per second. A convenient frequency, for example 500 cycles, may be selected for which a particular density of gas will produce standing waves of pressure within the chamber. The chamber itself is preferably provided with an internal length substantially one-half wave length or any odd integer multiple thereof for such a standing wave in order to couple the maximum pressure differential between ports 14 and 15.

With the arrangement described, slow neutrons will be absorbed to produce adiabatic pressure rises in substantially one half of the chamber 10 and will be excluded from the other half by shielding material 17. The modulated collecting field then completes means for producing an oscillating pressure, the amplitude of which varies with the concentration of slow neutrons in the bombarded region of the ionization chamber. This variation of pressure may then be observed by any suitable means which takes account of pressure differences between the two ends and is not subject to a common change in pressure throughout the entire chamber. It will be noted that gamma radiation and fast neutrons will generally be present in substantially equal quantities at both ends of the chamber and that beta radiation may be excluded entirely by absorption in the wall 11 or, if present, will be substantially equal in the two ends. Thus, the apparatus of Fig. 1 is selectively responsive to produce pressure differentials dependent in magnitude upon only the slow neutron content of the radiation.

Substantially similar results are achieved in accordance with a modification of the chamber of Fig. 1 illustrated in Fig. 2, wherein the chamber 20 is supplied with a gas 26 such as argon, which is nonresponsive to neutron bombardment. In this case, the shield material 17 is omitted and there is placed within the chamber 20, and having substantially one-half the length thereof, a material which produces ions upon bombardment by slow neutrons. This material is preferably thin and coated on the inner surface of the chamber 20, for example, to depths between .001 and .01 cm. Such a material, illustrated at 27, may comprise boron or some solid compound thereof. It may be noted that $U_{235}$ or Pu may be employed, although they may be less advantageous because of the limited range of the ionizing particles produced and because of delayed ionizing particles produced from fission fragments. The material 27 is preferably selected to include nuclides which capture slow neutrons and then very quickly split with the production of fast particles, which then ionize the gas 26 with which they are in close contact. Otherwise than as to the source of the ionization, the gas 26 performs in a manner similar to, and is entirely analogous to, the gas 16 of Fig. 1.

A further modification of the apparatus to accomplish a similar result is illustrated in Fig. 3 wherein the chamber 30 contains a gas 36 having a high content of hydrogen, and no constituent responsive to slow neutrons. It is observed that hydrogen ionizes upon bombardment by fast neutrons and does not ionize upon bombardment by slow neutrons. Accordingly, there is provided around one end of the chamber a shield material 37 comprising a moderator, such as paraffin, heavy water and the like. For convenience, paraffin may be selected having a thickness of two or three inches which either absorbs the fast neutrons or reduces their velocity to thermal velocities. Since thermal neutrons only are thus admitted to one end of chamber 30, no thermal heating occurs within that portion of the chamber. The opposite end of chamber 30 is affected by bombardment and consequent heating of the gas 36 to produce pressure differentials between ports 14 and 15 as in the previous cases. The essential difference here is that a means is provided for measuring only the hard component of radiation, especially fast neutrons. It is also observed that a thickness of absorber 37 may be employed, such for example, as one inch or less, which is found to be a sufficient thickness to reduce the neutron velocities below an effective value at which substantial ionization is produced in the gas 36. Various hydrocarbon and other hydrogen-containing gases may be selected for employment in chamber 30 in accordance with temperature and pressure conditions encountered, and may be further selected to be unaffected in nature by continued bombardment.

In the preceding description, it has been assumed that a difference in pressure between two ends of an ionization chamber may be produced and communicated to a differential pressure measuring device of any suitable design. For many purposes it may be inconvenient to operate by differential pressure measurement techniques, either because of the length of ducts 18 and 19 necessary to place the detecting apparatus at a suitable location or because of inherent difficulties in the differential pressure measurement itself. In Fig. 4 there is illustrated a modification applicable to the preceding figures, wherein ports 14 and 15 communicate pressure changes to transducer elements 48. These transducer elements produce electrical signals in accordance with instantaneous pressure applied to one face thereof. In order that the differential pressure may be measured in the absence of pressure changes common to both transducers, these transducers are fed to a suitable electronic amplifier 45, in opposition. This amplifier may also be in itself a differential amplifier, preferably including a detector in order to render an output proportional to the pressure differential, observable on conventional meter apparatus. It will be understood that any well known amplifier, detector and recording system may be employed to display or record the degree of pressure differential periodically produced at ports 14 and 15.

In Figs. 1, 2 and 3, a differential pressure device is illustrated at 51, comprising a diaphragm 52 exposed on the one side to the pressure communicated thereto by duct 18 and on the other side thereof to the pressure communicated through duct 19. An electromagnetic detection device 53 is illustrated as comprising, for example, a ferrous core adjacent to the diaphragm 52 and having a coil wound thereon, such that movement of the diaphragm to and from the core in response to periodic pressure differential applied thereto, results in an electric signal communicated, for example, to meter 54. The device 51, illustrated, may have its winding polarized in any conventional manner in order to produce such signal at 54 upon movement of the diaphragm 52.

From the foregoing description it will be seen that the modulated undirectional field applied between electrodes 11 and 12 produces a pressure differential of frequency determined by the frequency of modulation of the alternating component of the applied field. Conveniently, this may be selected as 500 cycles when electro-acoustical pick-up devices, such as 51, are employed. Some other frequency may be preferable in the event detecting apparatuses such as 45 and 48 are employed, which may operate more efficiently at higher frequencies. Likewise, other considerations, including dimensions of the space into which the apparatus must be inserted, may determine the frequency which may be employed because of limitations of size to produce a resonant condition within the gas 16, 26 or 36. The chamber 40 is illustrated as having gas 46 therein, which may be the same as that in Figs. 1, 2 or 3, depending upon which method of shielding or ion production is employed.

Obviously many modifications and variations of the present invention are possible in the light of the above teachings. It is therefore to be understood that within the scope of the appended claims the invention may be practiced otherwise than as specifically described.

What is claimed is:

1. Apparatus for measuring the intensity of selected radiations comprising, an enclosed chamber containing a gas, means associated with said chamber for restricting ionization arising from incidence of said selected radiations to a portion of said chamber, excitation means adapted to produce in said chamber a varying ion accelerating field, and means for indicating pressure variations within said chamber.

2. Apparatus for measuring the intensity of selected radiations comprising, an enclosed chamber containing a gas, means associated with said chamber restricting ionization arising from incidence of said selected radiations to a portion of said chamber, excitation means adapted to produce in said chamber an ion accelerating field modulated at a frequency selected to induce resonant pressure variations in said chamber, and pressure sensitive means associated with said chamber for indicating pressure variations in said chamber.

3. Apparatus for measuring the intensity of selected radiations comprising, an enclosed ionization chamber having a longitudinally extending electrode therein electrically insulated from said chamber to restrict ionization arising from incidence of said selected radiations to a portion of said chamber, said electrode and the walls of said chamber being adapted to sustain an electric field therebetween, and means associated with said chamber for indicating pressure differentials in said chamber.

4. In an apparatus for measuring thermal neutron intensities within a space, an ion-collecting chamber in said space having ionization response to the incident thermal neutrons, means applying ion accelerating fields in said chamber varying at a sonic frequency selected to correspond to standing wave resonance therein, means shielding one portion of the chamber from said thermal neutrons and sonic means detecting standing wave variations of pressure between said shielded portion and the remainder of the chamber.

5. In the apparatus of claim 4, said chamber containing a gaseous boron compound variably ionizable in proportion to the incident intensity of thermal neutrons.

6. Apparatus for detecting intensity of irradiation by neutrons comprising an ionization chamber electrically energized periodically, a gas therein occupying a length acoustically resonant at the frequency of said periodic energization, means restricting ion production selectively to one end of the chamber, whereby heating of the gas is selectively greater during said periods at said end of the chamber, and sonic means detecting resonant pressure waves within the gas resulting from said selective restriction of ionization and resultant heating of the gas.

7. In the apparatus of claim 6, said gas being nonreactive to neutrons and said restricting means being an ion source responsive to thermal neutron bombardment applied within only one end portion of said chamber to selectively ionize and thereby selectively heat said end portion.

8. In the apparatus of claim 6, said detecting means being a differential pressure microphone having opposite pressure faces actuated respectively by pressure conduction connections to the respective end portions of the gas in the chamber.

9. In the apparatus of claim 6, said detecting means being responsive to indicate the difference of pressure at said resonant frequency between two opposite end portions of the chamber.

10. In the apparatus of claim 6, said gas including hydrogen and said restricting means being absorptive of fast neutrons, whereby hydrogen atoms are subjected to fast neutron bombardment at said end of the chamber only.

No references cited.